Nov. 3, 1953 W. W. COXE, JR 2,658,101

MOBILE RADIO CABINET STRUCTURE

Filed Jan. 20, 1950 2 Sheets-Sheet 1

Inventor

WHITWELL W. COXE, JR.

By H. O. Newton

Attorney

MOBILE RADIO CABINET STRUCTURE

Filed Jan. 20, 1950 2 Sheets-Sheet 2

Inventor
WHITWELL W. COXE, JR.
By H. W. Newton
Attorney

Patented Nov. 3, 1953

2,658,101

UNITED STATES PATENT OFFICE 2,658,101

MOBILE RADIO CABINET STRUCTURE

Whitwell W. Coxe, Jr., Bristol, Tenn., assignor to Radio Corporation of America, a corporation of Delaware Application January 20, 1950, Serial No. 139,709

7 Claims. (Cl. 174—51)

This invention relates generally to radio cabinet structures for encasing and supporting radio equipment of the type generally but not necessarily associated with mobile use, and more particularly it relates to radio cabinet mounting and structure means of the type that is easily accessible for servicing and inspection.

In the mobile radio equipment art a problem is presented in providing a cabinet, the interior of which is easily accessible yet which can be mounted in a limited space. Furthermore, conventional cabinets having a variety of designs must be provided to fit different compartment sizes and shapes in different mobile units. For example a luggage compartment of an automobile is generally irregular and its available mounting space for mobile radio equipment varies with the automobile make. The spare tire mounting and other obstructions in such compartments make access to and mounting of radio equipment a major design problem.

Delicate radio equipment of the type described has to be firmly mounted, well grounded, and well ventilated in the available space, yet easily removable for servicing or replacement. Accordingly, the prior art cabinet design has been more or less unique to the particular compartment characteristic, with the resulting high cost of design of many individual custom-built cabinet shapes and styles.

In the general radio cabinet art, additional problems are presented. In particular there is a need for an easily manufactured cabinet which can be assembled in a minimum number of steps. It is easily recognized that service and labor costs are increased greatly if there are many separate elements of manufacture and assembly. At the same time, however, a certain number of removable elements must be provided to facilitate inspection and servicing in use. A further problem is presented in designing a utility cabinet structure which has a pleasing appearance.

Although many cabinet structures have been suggested in the prior art there are no known structures which have been entirely successful in obtaining the desired results hereinbefore mentioned.

In view of the foregoing problems, it is an object of this invention to provide a single radio cabinet structure which is adapted for receiving a variety of radio equipment, which may be mounted in many different positions while presenting the included equipment for ready inspection and servicing, and which presents a uniform and pleasing appearance regardless of the position in which it is mounted.

Another object of this invention is to provide an easily assembled radio equipment mounting and cabinet structure or housing means which is inherently free of the foregoing and other prior art limitations.

A further object of this invention is to provide a radio cabinet structure that has a minimum number of structural elements so coordinated and related that both manufacture and assembly in any one of many forms and for various uses, may readily be accomplished in minimum time and at low cost.

A still further object of this invention is to provide a universal type radio cabinet for mobile equipment which may be firmly mounted in many different positions and in many different types of compartments of limited space, yet which may be well ventilated and easily accessible in the interior in any mounted position.

In accordance with the invention there is therefore provided a radio cabinet structure comprising a chassis member having cabinet end closure members rigidly secured to and substantially unitary therewith, and having two removable L-shaped cabinet members embracing the end closure members, and providing a generally closed cabinet arrangement.

The foregoing and further advantages of this invention will become apparent from the following detailed description when considered in conjunction with the accompanying drawings in which.

Figures 1, 2, 3, 4:
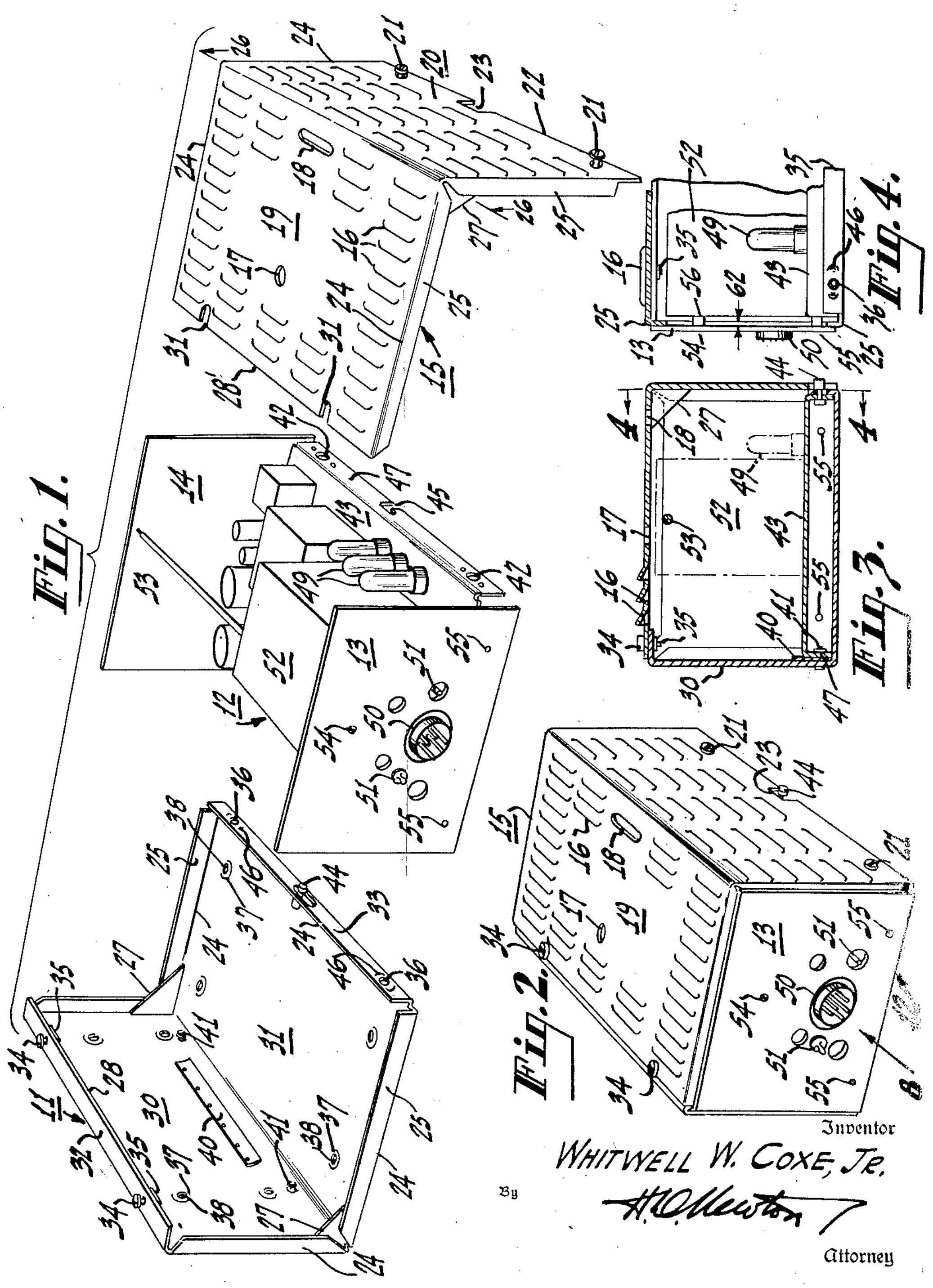
Figure 1 is a view in perspective of a cabinet structure embodying the invention, the several elements thereof being shown in exploded relationship.
Figure 2 is a perspective view of the cabinet structure of Figure 1, showing the several elements in assembled relation.
Figure 3 is a sectional view in elevation, of the cabinet structure shown in Figures 1 and 2, taken looking along line 3 of Figure 2.
Figure 4 is a fragmentary sectional view in elevation, of the cabinet structure of Figures 1 and 2 taken along the lines 4—4 of Figure 3.

Referring specifically to the drawing, in which like reference characters designate similar parts throughout the several views, there is provided in Figure 1 a disassembled exploded view of the cabinet structure comprising an L-shaped base member 11 having a major surface 31 and a minor surface 30, a radio chassis unit or end closure assembly 12 having end closure members 13, 14 mounted thereupon, and spaced by a chassis or other apparatus container member 43, and an L-shaped cover member 15, which may be easily removed to provide access to the interior of the cabinet when assembled, and which has a major surface 19 and a minor surface 20.

The cover member 15 is provided with louvres 16, which may be stamped therein, thereby affording a means for ventilation of the cabinet unit when assembled and in operation. Openings 17, 18 are arranged generally midway in the major surface 19 of the L-shaped cover member 15 for purposes of gripping and lifting it with one hand upon occasion for removal of the cover or in assembling or disassembling the cabinet. These gripping openings allow the cover member 15 to be lifted without grasping any of the edges, thereby permitting the cover to be removed even though the cabinet may be mounted in a restricted space.

The minor surface 20 of the L-shaped cover has fastening members 21 such as airplane type fastener studs or the like fixed in one lateral edge 22, whereby the cover 15 may be firmly fixed to the corresponding edge 24 of the L-shaped base member 11 and to the chassis 43 by a fastener body located behind holes 42 in the chassis. A notch 23 is provided in this same edge 22 for obtaining access to a latch member 44 used in latching the chassis unit 12 to the base 11 to prevent the chassis from falling out when the cover 15 is removed. This, of course, is necessary when the base 11 is mounted by means of fasteners through the holes 38 in the minor face 30 or whenever the chassis is mounted in a vertical plane. (See Figs. 5 and 7). The operation and construction of this latch 44 will be described more fully hereinafter. The major surface 19 of the cover 15 is provided with notches 31 rather than screws 21, these notches 31 corresponding to fastening members 34 in the minor surface 30 of the counterpart base member 11 in a manner which will be described hereinafter.

Flanking edges 24 of both the minor and major surfaces of the cover 15 and also the base 11 are bent inwardly to form flanges 25. These flanges fit snugly inside the end closure members 13, 14 in assembled position thereby providing a closed cabinet lid structure which prevents end play of the chassis assembly 12, as well as bending or deformation of the end closure members 13, 14.

The cover member 15 complete with the louvered openings 16 may be stamped from a single metal sheet and bent along the line 26—26 to form it into an L-shape. Gusset plates 27 may be welded or bolted to and substantially coplanar with the flanges 25 along the flanking edges of either the cover or base to rigidly fix the cover into L-shape and strengthen the cabinet against any torsional or shearing forces which might be applied thereto.

The base member 11 of the cabinet structure is similarly stamped from a single sheet of metal and is provided with flanged lateral edges 25 and gusset plates 27 as described above. However, the longitudinal edges 28, 29 or both the minor 30 and major 31 surfaces of the base member 11 are additionally bent to provide substantially perpendicular flanges 32, 33. Fastening devices 34 are affixed to the base member minor surface flange 32 by nuts 35, or the like, so that they will register with the corresponding notches 31 in the unflanged lateral edge 28′ of the cover member major surface 19 when the cabinet structure is assembled. Likewise detents 46 are provided with openings 36 in the major surface flange 33 of the base 11 to register with the hereinbefore described fastening devices 21 in the corresponding cover edge 22. These detents 46 are used to space the chassis away from the flange 33.

Detented wells 37 having mounting openings 38 centered therein are provided in both the major and minor surfaces 30, 31 of the base 11 thereby presenting a template for drilling mounting holes through either surface. It is readily seen that the L-shaped base plate member can be easily and firmly mounted in a limited space by means of fasteners secured through these wells to a mounting surface. Plenty of space is thereby provided for drilling holes or for driving screws or bolts, and the base member 11 may be mounted upon either the major or minor surface, or both, as will hereinafter be shown.

A resilient bias member 40 is provided on the inside minor surface 30 of the base member 11 to firmly contact a metal surface on the chassis unit 12 when the cabinet is assembled and thereby to ground the chassis unit to the cabinet and at the same time to provide a resilient shock mount. Bosses 41 are fixed in the base near the resilient member 40 to register with corresponding female openings 42 which are located in flanges 47 on either side of the chassis 43 which in combination with the end closure members 13, 14 comprises the end closure assembly 12. A latch assembly 44 is mounted in the flange 33 of the major base surface 31 to register with a notch 45, provided on either side of the chassis 43 in the generally perpendicular chassis flanges 47, when the chassis unit 43 is mounted in the base 11. As explained above an opening 23 is provided in the cover member to afford access to the latch member 44 when the cabinet is in assembled position.

The detents 46 provided around the base flange openings 36 force the chassis flange 47, which is placed nearest the flange 33 of the base 11 when the chassis is mounted in the base, thereby forcing the chassis flange openings 42 onto the bosses 41 and biasing the chassis by contact of a portion of the chassis against the resilient member 40, to provide both a shock mount and a positive ground connection for the chassis. The base flange openings 36 are made to register with the female openings 42 in the chassis flange 47 and extended portions of the fastening studs 21 firmly boss the chassis in place in mounted position by suitable means such as aircraft fastener nuts in the chassis 43 such as may be behind the chassis flange apertures 42 as shown in the drawing.

Radio parts, as shown in the drawing and signified by the tubes 49, are mounted upon the chassis 43, and apertures, such as those shown for a connecting cable, 50, are provided in one end closure member 13 for power plugs and externally adjustable control shafts 51 and the like. A shielding can 52, used to enclose certain radio tuning elements in combination with the brace rod 53 form a lateral bracing member at the top of the end closure members 13, 14. These end members are fastened to the chassis by means of screws 55 and are fastened to the bracing member by means of the screws 54. The end members 13, 14 are separated a small distance from the chassis by means of sleeves 56 (shown in Figure 4) which are concentrically disposed about the screws 54, 55 between the end members 13, 14 and the chassis 43. The resulting separation 62 should be at least wide enough for the base and cover flange members 25 to fit snugly therein.

The assembled unit of the described members is shown in perspective in Figure 2. The louvered cover member 15 and the apertured end 13 of the closure assembly 12 will be visible in any of the aforementioned several diverse mounting positions, and are therefore preferably finished to present a pleasing appearance. As will hereinafter be more fully described the cover member 15 is visible as a cabinet cover in either mounted position and the apertured end 13 is also visible in either mounted position by changing the chassis assembly end for end should it be necessary thereby presenting a uniform appearance.

It is seen in this view that the cover member 15 may be removed simply by loosening the four studs 21, 34 and lifting by the gripping apertures 17, 18, thereby exposing the chassis assembly 12 for servicing or removal. The chassis assembly 12 may likewise be easily removed by unfastening the latch 44 and grasping the bracing member 53 to lift it from the base 11.

Figure 3 is a sectional view of the internal structure of the cabinet as taken when looking inward along line 8 of Figure 2. The chassis 43 is shown firmly pressing the resilient member 40 against the base plate minor surface 30. A positive ground contact is made between the chassis and cabinet in this manner thereby preventing arcing or popping which might be present in mobile equipment when subjected to vibration. The bosses 41 are shown in registration with the corresponding chassis female members on the flange 47. They serve to anchor the chassis firmly in position so that there is no end play or vertical jumping.

Figure 4 is an elevation section view of Figure 3 along the lines 4—4. The aforementioned sleeves 56 separate the end member 13 from the chassis 43 and provide a gap 62 into which the flanges 25 of both the base member 11 and the cover member 15 snugly fit.

Some of the different mounting positions of the cabinet are shown in Figures 5–8. In each figure the cabinet is shown mounted in a mobile unit such as an automobile 59. A corner of an automobile luggage compartment 60 is shown in perspective in the several views having the cabinet mounted therein. The end 13 and louvered cover members 15 are visible in each of the mounting positions thereby showing the uniformity of appearance available by means of the invention. By considering these views it is seen that several other positions are available and therefore a single cabinet structure can be used universally for mobile radio equipment.

Figure 5:
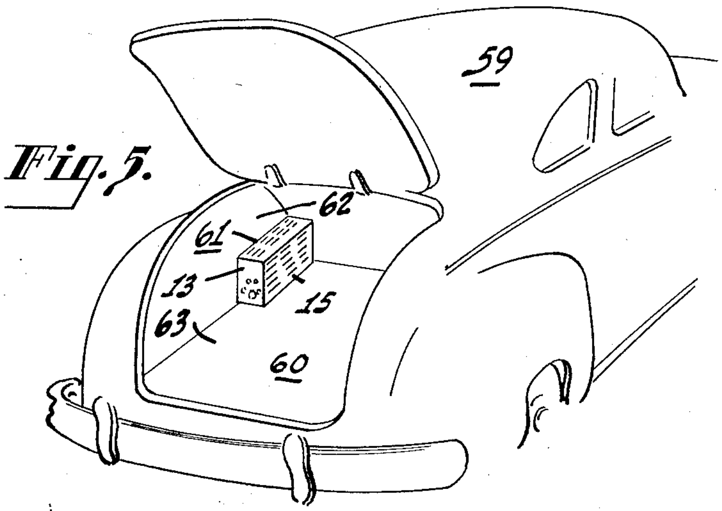
Figures 5–8 inclusive, are fragmentary views in perspective of an automobile or the like showing a compartment and a cabinet structure embodying the invention in its adaptation to various mounting positions therein.
Figure 6:
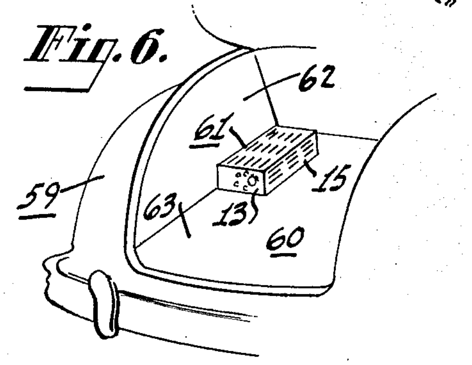
Figure 7:
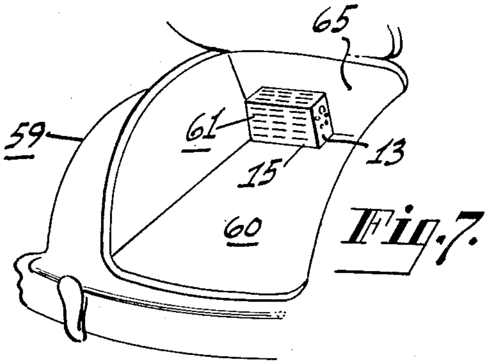

In Figures 5, 6 and 7, the cabinet 61, in this embodiment a rectangular parallel-piped as hereinbefore described, is shown mounted in the left rear corner of an automobile luggage compartment or trunk 60. In this position the major surfaces of the cover and base members may be vertical as in Figures 5 and 7, and the major base surface may be affixed to either the side wall 62 (as shown in Figure 5) of the trunk or the back wall 65 (as shown in Figure 7). In either case the apertured end closure member 13 is directed outward from the trunk walls by mounting the chassis assembly in one of its two end-for-end positions.

By making the cabinet structure of the basic three elements, viz., the chassis assembly, the L-shaped base plate and the L-shaped cover plate, as provided by the invention, the cabinet may be mounted and by making the chassis assembly element mountable in either of its two end-for-end positions, the assembled cabinet may be arranged so that the apertured end 13 always projects outward into the trunk in an accessible position.

Should the trunk be shallow the cabinet may be mounted with the major surfaces horizontal as shown in Figure 6.

Figure 8:
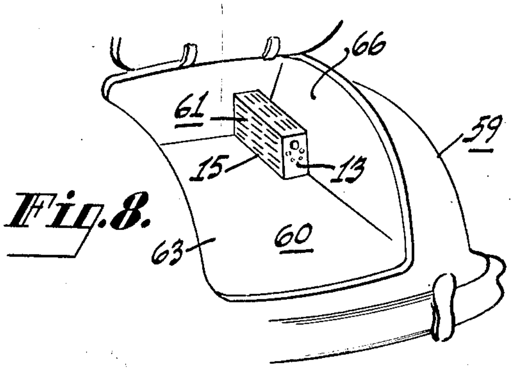

The cabinet may be mounted in other positions such as in the right rear corner of a trunk as shown in Figure 8 where the major surface of the base is affixed to the right hand trunk wall 66.

From a consideration of these mounting positions it is easily seen that the cabinet structure permits mounting in any corner position or in a position along any wall. It is also seen that the exterior tuning adjustments and cable connectors are directed so that they are readily accessible in all mounting positions and that the louvered cover plate not only presents a pleasant appearance, but provides adequate ventilation and can be readily removed in all mounting positions.

In each position as shown the cover plate 15 may be removed easily as hereinbefore described. After such removal the chassis assembly 12 may then easily be lifted out to be serviced or replaced.

The invention just described therefore provides a cabinet structure for mobile equipment, or the like, which may be mounted in many different positions, yet which presents a pleasing and uniform appearance in each mounted position and to which access is provided for easy servicing or removal in any position. The described embodiment of this structure comprises an L-shaped base member plate, a chassis or apparatus container assembly, end closure members, an L-shaped cover member plate which firmly embraces the complementary base member, thereby enveloping the chassis assembly which is positioned therein, and fastening means affixing the end closure members at opposite ends of said base and cover plates.

It will be understood that the invention is not necessarily limited to the particular adaptations herein set forth, and that modifications may be made which will not depart from the spirit or the scope of the invention. Novel features which are clearly indicated in the foregoing full description of the nature, construction and operation of the invention are contained in the appended claims.

What is claimed is:

1. A radio cabinet structure comprising in combination, a quadrilateral chassis for mounting radio equipment comprising a shelf member having generally perpendicular flanges, quadrilateral cabinet end closure members, fastening means for firmly fixing said end closure members to opposite ends of said chassis, an L-shaped cabinet base member having inwardly directed flanges on at least two edges, an L-shaped cabinet cover member with inwardly directed flanges on at least two ends, spacing means associated with said fastening means for separating said end closure members from said chassis by at least the thickness of said flanges, and fastening elements in said flanges for holding said L-shaped members in a cooperatively embracing arrangement inside said end members thereby to provide a separable container for said equipment, which may be mounted in a plurality of positions.

2. A structure as defined in claim 1 wherein a bracing member is inserted between the end closure members at a point removed from said chassis.

3. A cabinet structure as defined in claim 1 wherein said fastening elements are externally accessible in only said cover member.

4. A structure as defined in claim 3 wherein boss elements are provided in said base member, apertures are provided in said chassis member in registration relationship with said bosses, and chassis locking means is provided including apertures in one of said base member flanges and in said chassis for firmly fixing said chassis in place in said base member when said apertures and said boss elements are in register.

5. A structure as defined in claim 4 wherein said chassis comprises electrically conducting metallic portions; and a resilient element of electrically conducting material affixed to said base member and located to contact metallic portions of the chassis when in locked position, thereby simultaneously providing a resilient shock mounting for said chassis and a positive ground connection.

6. A cabinet structure comprising, in combination, two end members rigidly connected in fixed spaced relation, an apparatus container member providing said connection, a pair of complementary closure members each adapted to engage each other and approximately one half the periphery of the end members, one of said closure members having a pair of flanges each of which extends in a direction substantially at right angles to the other, engaging the inner surface of the other of said closure members when said closure members are engaged with each other, and means for cooperatively and releasably fixing said closure members to said end members to form therewith a closed separable container adapted for mounting in a plurality of different positions, said means comprising a plurality of fasteners each extending through one of said flanges and beyond the outer surface of said other of said closure members only when said closure members are engaged with each other.

7. A structure as defined in claim 6 wherein said closure members have substantially perpendicular flanges which engage inner periphery faces of said end members and cooperate therewith to brace said structure against undesired deformation and end play.

WHITWELL W. COXE, Jr.

References Cited in the file of this patent

UNITED STATES PATENTS

| Number | Name | Date |
|---|---|---|
| 1,654,225 | Tanner | Dec. 27, 1927 |
| 2,377,432 | Lear | June 5, 1945 |
| 2,378,406 | Harris | June 19, 1945 |
| 2,483,269 | Fender | Sept. 27, 1949 |
| 2,510,103 | Griffin | June 6, 1950 |